(12) United States Patent
Anderson et al.

(10) Patent No.: US 12,468,596 B2
(45) Date of Patent: Nov. 11, 2025

(54) TEMPORAL BUFFERING OF INTEGRITY COMPARISON DATA

(71) Applicant: Rockwell Collins, Inc., Cedar Rapids, IA (US)

(72) Inventors: Eric N. Anderson, Marion, IA (US); Matthew P. Corbett, Mount Vernon, IA (US); Jason R. Owen, Marion, IA (US); Russ D. Uthe, Ely, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 27 days.

(21) Appl. No.: 18/639,573

(22) Filed: Apr. 18, 2024

(65) Prior Publication Data

US 2025/0328408 A1   Oct. 23, 2025

(51) Int. Cl.
*G06F 11/00* (2006.01)
*G06F 11/07* (2006.01)
*G06F 11/16* (2006.01)

(52) U.S. Cl.
CPC ........ *G06F 11/079* (2013.01); *G06F 11/0721* (2013.01); *G06F 11/1608* (2013.01); *G06F 11/1629* (2013.01)

(58) Field of Classification Search
CPC ............... G06F 11/1608; G06F 11/1629
See application file for complete search history.

(56) References Cited

U.S. PATENT DOCUMENTS

| | | | |
|---|---|---|---|
| 4,245,344 A | 1/1981 | Richter | |
| 4,254,492 A | 3/1981 | McDermott, III | |
| 4,328,583 A | 5/1982 | Stodola | |
| 4,342,112 A | 7/1982 | Stodola | |
| 4,371,754 A | 2/1983 | De et al. | |
| 4,750,181 A | 6/1988 | McDonald et al. | |
| 5,170,401 A | 12/1992 | Mohr | |
| 5,355,090 A | 10/1994 | Pajowski et al. | |
| 6,002,970 A | 12/1999 | Abdelnour et al. | |
| 6,883,121 B1 | 4/2005 | Jensen et al. | |
| 6,895,582 B1 | 5/2005 | Greve | |
| 6,948,091 B2 | 9/2005 | Bartels et al. | |
| 7,027,880 B2 | 4/2006 | Izzo et al. | |

(Continued)

OTHER PUBLICATIONS

H. D. Doran and T. Lang, "Dynamic Lockstep Processors for Applications with Functional Safety Relevance," 2021 26th IEEE International Conference on Emerging Technologies and Factory Automation (ETFA ), Vasteras, Sweden, 2021, pp. 1-4 (Year: 2021).*

(Continued)

*Primary Examiner* — Bryce P Bonzo
*Assistant Examiner* — Gabriella Kanani Shelton
(74) *Attorney, Agent, or Firm* — Suiter Swantz IP

(57) ABSTRACT

A system-on-chip may include application processing cores which execute safety critical applications and an integrity application. The system-on-chip may also include integrity processing cores which execute an integrity monitor. The integrity monitor may compare integrity application outputs and integrity monitor outputs to detect if the processing cores have experienced a common mode fault. The integrity processing cores may perform temporal monitoring to accommodate time-asynchronization's between the application processing cores and the integrity processing cores.

20 Claims, 8 Drawing Sheets

(56) References Cited

U.S. PATENT DOCUMENTS

| | | |
|---|---|---|
| 7,320,064 B2 | 1/2008 | Ramos et al. |
| 7,392,426 B2 | 6/2008 | Wolfe et al. |
| 7,565,586 B2 | 7/2009 | Thompson |
| 7,679,403 B2 | 3/2010 | Erstad |
| 7,809,863 B2 | 10/2010 | Beutler et al. |
| 7,852,235 B1 | 12/2010 | Johnson et al. |
| 8,015,390 B1 | 9/2011 | Corcoran et al. |
| 8,301,867 B1 | 10/2012 | Mazuk et al. |
| 8,743,020 B1 | 6/2014 | Mazuk et al. |
| 9,137,038 B1 | 9/2015 | Mazuk et al. |
| 9,256,486 B2 | 2/2016 | Saito |
| 9,454,418 B1 | 9/2016 | Kovalan et al. |
| 9,552,271 B1 | 1/2017 | Fetta et al. |
| 9,714,081 B1 | 7/2017 | Hall, III et al. |
| 9,891,978 B1 | 2/2018 | Fejfar et al. |
| 9,964,937 B2 | 5/2018 | Koh |
| 9,973,515 B1 | 5/2018 | Corbett et al. |
| 10,114,777 B1 | 10/2018 | Owen et al. |
| 10,144,529 B1 | 12/2018 | Fetta et al. |
| 10,242,179 B1 | 3/2019 | Corbett et al. |
| 10,345,801 B2 | 7/2019 | Dehaas et al. |
| 10,372,901 B1 | 8/2019 | Marek |
| 10,447,588 B1 | 10/2019 | Fannin et al. |
| 10,452,446 B1 | 10/2019 | Bloom et al. |
| 10,454,656 B1 | 10/2019 | Nelson et al. |
| 10,466,702 B1 | 11/2019 | Bloom et al. |
| 10,541,944 B1 | 1/2020 | Nelson et al. |
| 10,579,469 B2 | 3/2020 | Geng et al. |
| 10,719,356 B1 | 7/2020 | Corbett et al. |
| 10,771,194 B2 | 9/2020 | Tune et al. |
| 10,901,865 B2 | 1/2021 | Bryant et al. |
| 10,909,006 B2 | 2/2021 | Ainsworth et al. |
| 10,970,154 B2 | 4/2021 | Grimm |
| 11,003,196 B2 | 5/2021 | Li et al. |
| 11,029,706 B2 | 6/2021 | Li et al. |
| 11,181,957 B1 | 11/2021 | Prasadh et al. |
| 11,200,312 B1 | 12/2021 | Greve et al. |
| 11,224,094 B1 | 1/2022 | Corbett et al. |
| 11,243,504 B2 | 2/2022 | Wrobel et al. |
| 11,263,073 B2 | 3/2022 | Boettcher et al. |
| 11,372,981 B2 | 6/2022 | Bean et al. |
| 11,494,256 B2 | 11/2022 | Meriac et al. |
| 11,556,113 B2 | 1/2023 | Izzo et al. |
| 11,586,497 B1* | 2/2023 | Geist ............... B64G 1/223 |
| 11,591,092 B2 | 2/2023 | Horner |
| 11,780,603 B2 | 10/2023 | Hooker |
| 2006/0236168 A1 | 10/2006 | Wolfe et al. |
| 2007/0220367 A1 | 9/2007 | Smith et al. |
| 2008/0005706 A1* | 1/2008 | Sharma ............... H04L 1/203 |
| | | 716/136 |
| 2019/0114243 A1* | 4/2019 | Santoni ............ G06F 11/1641 |
| 2020/0089559 A1 | 3/2020 | Ainsworth et al. |
| 2020/0145251 A1* | 5/2020 | Hass ................ G06F 11/076 |
| 2021/0064234 A1 | 3/2021 | Zhang et al. |
| 2021/0373898 A1* | 12/2021 | Selwan ............ G06F 9/3861 |
| 2023/0356730 A1 | 11/2023 | Schmidt |
| 2024/0231900 A1* | 7/2024 | Kamaraj ............ G06F 9/5083 |

OTHER PUBLICATIONS

Y. C. Yeh, "Triple-triple redundant 777 primary flight computer," 1996 IEEE Aerospace Applications Conference. Proceedings, Aspen, CO, USA, 1996, pp. 293-307 vol. 1 (Year: 1996).*

Sim et al.; A Dual Lockstep Processor System-on-a-Chip for Fast Error Recovery in Safety-Critical Applications; 2020; IEEE (Year: 2020).*

Jeffrey Voas et al. "Reducing Uncertainty About Common-Mode Failures", Published Jan. 1, 1997; retrieved; Feb. 26, 2024; https://apps.dtic.mil/sti/pdfs/ADA465215.pdf.

Steven L. Hogan, "Effective Fault Management Guidelines", published Jun. 5, 2009; retrieved on Feb. 26, 2024; https://aerospace.org/sites/default/files/maiw/TOR-2009(8591)-14.pdf.

* cited by examiner

| Cycle # | Output 131 | Output 137 | Comparison | Counter 138 |
|---|---|---|---|---|
| 0 | - | - | - | 0 |
| 1 | 3c4n9hygvf93av4j | 1gtd3o9yoizv2s4x | Mis-compare | 2 (+2) |
| 2 | sjx168svpaoqxwjz | sjx168svpaoqxwjz | Valid-compare | 1 (-1) |
| 3 | kchj0glnwck047zr | amwrovkx1oknoa2y | Mis-compare | 3 (+2) |
| ... | ... | ... | ... | ... |
| n | z7gx4b6prup822pk | 1o78n6kf4qor0gw0 | Mis-compare | Strike Counter Threshold (+2) |
| RESET | RESET | RESET | RESET | RESET |

At Cycle 6

| Buffer 302 with Output 131 | Buffer 304 with Output 137 |
|---|---|
| f52f0af75194b039 | f52f0af75194b039 |
| 9543062a095a6514 | a718e5e2efa316a8 |
| a7bebe9ac9e34480 | ab4d525edd496b92 |
| 8f8d7755d19cdf25 | 6102717915dbeac5 |
| ea3d0d11db6b8cde | a718e5e2efa316a8 |
| 69c6a31da1abb663 | 199bdcf8db3df244 |

| Comparison | Counter 138 |
|---|---|
| Valid-compare (Buffer 302 row 1 with Buffer 304 row 1) | 0 |

At Cycle 7

| Buffer 302 with Output 131 | Buffer 304 with Output 137 |
|---|---|
| dcdb4f842bb4df92  | a21b6bec74df17d5 |
| 9543062a095a6514 | a718e5e2efa316a8 |
| a7bebe9ac9e34480 | ab4d525edd496b92 |
| 8f8d7755d19cdf25 | 6102717915dbeac5 |
| ea3d0d11db6b8cde | a718e5e2efa316a8 |
| 69c6a31da1abb663 | 199bdcf8db3df244 |

| Comparison | Counter 138 |
|---|---|
| Mis-compare | 2 (+2) |

400

At Cycle 8

| Buffer 302 with Output 131 | Buffer 304 with Output 137 |
|---|---|
| dcdb4f842bb4df92 | a21b6bec74df17d5 |
| a21b6bec74df17d5 | f78708313bc6cfc0 |
| a7bebe9ac9e34480 | ab4d525edd496b92 |
| 8f8d7755d19cdf25 | 6102717915dbeac5 |
| ea3d0d11db6b8cde | a718e5e2efa316a8 |
| 69c6a31da1abb663 | 199bdcf8db3df244 |

| Comparison | Counter 138 |
|---|---|
| Valid-compare (Buffer 302 row 2 with Buffer 304 row 1) | 1 (−1) |

At Cycle N

| Buffer 302 with Output 131 | Buffer 304 with Output 137 |
|---|---|
| b39aedc309770 64e | 8e334e7caccbdf61 |
| 36705d7445200375 | 6536779d52ccf5a6 |
| 110d536c44b5bbbb | 72237b551c12df27 |
| c7320b782cd5ec73 | ce3b77ea686b9bc7 |
| 02707f604a4ba380 | fff59231608e4426 |
| 17280e672168d0b5 | 67a4cb2f9b8de130 |

| Comparison | Counter 138 |
|---|---|
| Mis-compare | Strike Counter Threshold (+2) |

TEMPORAL BUFFERING OF INTEGRITY COMPARISON DATA

TECHNICAL FIELD

The present disclosure generally relates to error detection, and more specifically to error detection by redundancy in hardware.

BACKGROUND

A common approach to mitigating no single fault requirements (i.e., common mode faults) is to independently execute functions on dissimilar processors and compare the results. These results are only "nearly identical" if the input data sets and functional processing cycles are aligned in time. Relatively small differences in timing can lead to non-identical input states between the processors and produce non-identical outputs. The differences in timing is true for both fully independent processing subsystems and for independent partitions scheduled on the dissimilar cores of a heterogenous multicore system on a chip.

Higher levels of integration complicate synchronization of asynchronous hardware events within the multicore system-on-chip (SoC) devices. Approaches for ensuring temporal alignment in data streams and processing tasks typically result in complex and costly data/execution synchronization schemes. Therefore, it would be advantageous to provide a device, system, and method that cures the shortcomings described above.

SUMMARY

In some aspects, the techniques described herein relate to a system-on-chip including: one or more application processing cores with a first instruction set architecture, wherein the one or more application processing cores are configured to execute an integrity application and one or more safety critical applications, wherein the integrity application is configured to generate one or more integrity application outputs; one or more integrity processing cores with a second instruction set architecture, wherein the first instruction set architecture and the second instruction set architecture are different, wherein the one or more integrity processing cores are configured to execute an integrity monitor, wherein the integrity monitor is configured to generate one or more integrity monitor outputs, wherein the integrity monitor is configured to compare the one or more integrity application outputs and the one or more integrity monitor outputs to detect one of a valid-compare or a mis-compare; and an integrity memory; wherein the one or more application processing cores and the one or more integrity processing cores are asynchronized, wherein the integrity memory is configured to provide temporal buffering between the one or more integrity application outputs and the one or more integrity monitor outputs when the integrity monitor compares the one or more integrity application outputs and the one or more integrity monitor outputs.

In some aspects, the techniques described herein relate to a system-on-chip, wherein the integrity memory maintains a strike counter, wherein the integrity monitor causes the strike counter to increment one or more strikes when the integrity monitor detects the mis-compare.

In some aspects, the techniques described herein relate to a system-on-chip, wherein the integrity monitor causes the strike counter to decrement one or more strikes when the integrity monitor detects the valid-compare.

In some aspects, the techniques described herein relate to a system-on-chip, wherein the integrity monitor causes the strike counter to increment more strikes for the mis-compare than decrementing strikes for the valid-compare.

In some aspects, the techniques described herein relate to a system-on-chip, wherein the integrity monitor causes the strike counter to decrement to zero when the integrity monitor detects the valid-compare.

In some aspects, the techniques described herein relate to a system-on-chip, wherein the integrity monitor is configured to increment the strike counter up to a strike counter threshold; wherein the integrity monitor detects a fault at the strike counter threshold.

In some aspects, the techniques described herein relate to a system-on-chip, wherein the integrity memory maintains an integrity application output buffer and an integrity monitor output buffer; wherein the integrity memory is configured to provide temporal buffering by the integrity application output buffer and the integrity monitor output buffer; wherein the integrity memory is configured to store the one or more integrity application outputs and the one or more integrity monitor outputs in the integrity application output buffer and the integrity monitor output buffer, respectively; wherein the integrity monitor is configured to compare the one or more integrity application outputs stored in the integrity application output buffer and the one or more integrity monitor outputs stored in the integrity monitor output buffer to detect one of the valid-compare or the mis-compare.

In some aspects, the techniques described herein relate to a system-on-chip, wherein the integrity monitor detects the valid-compare when at least one of the one or more integrity application outputs in the integrity application output buffer match at least one of the one or more integrity monitor outputs in the integrity monitor output buffer; wherein the integrity monitor detects the mis-compare when none of the one or more integrity application outputs in the integrity application output buffer match the one or more integrity monitor outputs in the integrity monitor output buffer.

In some aspects, the techniques described herein relate to a system-on-chip, wherein at least one of: the one or more application processing cores include a dual lockstep pair of the one or more application processing cores; or the one or more integrity processing cores include a dual lockstep pair of the one or more integrity processing cores.

In some aspects, the techniques described herein relate to a system-on-chip, wherein at least one of: the one or more application processing cores include triple-modular redundancy with three of the one or more application processing cores; or the one or more integrity processing cores include triple modular redundancy with three of the one or more integrity processing cores.

In some aspects, the techniques described herein relate to a system-on-chip, wherein the one or more safety critical applications do not include application specific independent integrity checks capable of detection of a common mode failure.

In some aspects, the techniques described herein relate to a system-on-chip, including one or more communication interfaces, wherein the one or more communication interfaces are configured to provide one or more inputs to the one or more application processing cores and the one or more integrity processing cores.

In some aspects, the techniques described herein relate to a system-on-chip, wherein the one or more inputs include at least one of air data, position, altitude, attitude, engine data, flight controls, fire warning, cabin pressure, engine thrust, exhaust gas temperature, speed, angle of attack, pitch angle, flight path angle, acceleration, or rate of descent.

In some aspects, the techniques described herein relate to a system-on-chip, wherein the integrity application includes a set of commands, wherein the set of commands use the one or more inputs to exercise the first instruction set architecture used by the one or more safety critical applications.

In some aspects, the techniques described herein relate to a system-on-chip, wherein the one or more integrity application outputs and the one or more integrity monitor outputs include a direct data output or a computed signature of the direct data output.

In some aspects, the techniques described herein relate to a system-on-chip, wherein the integrity monitor is configured to compare the one or more integrity application outputs and the one or more integrity application outputs to detect one of the valid-compare or the mis-compare by one of an exact match or a tolerance match.

In some aspects, the techniques described herein relate to a system-on-chip, wherein the integrity monitor is configured to reset the one or more application processing cores and the one or more integrity processing cores upon detecting a fault.

In some aspects, the techniques described herein relate to a system-on-chip including: one or more application processing cores with a first instruction set architecture, wherein the one or more application processing cores are configured to execute an integrity application and one or more safety critical applications, wherein the integrity application is configured to generate one or more integrity application outputs, wherein the one or more safety critical applications do not include application specific independent integrity checks capable of detection of a common mode failure; one or more integrity processing cores with a second instruction set architecture, wherein the first instruction set architecture and the second instruction set architecture are different, wherein the one or more integrity processing cores are configured to execute an integrity monitor, wherein the integrity monitor is configured to generate one or more integrity monitor outputs, wherein the integrity monitor is configured to compare the one or more integrity application outputs and the one or more integrity monitor outputs to detect one of a valid-compare or a mis-compare; an integrity memory; and one or more communication interfaces, wherein the one or more communication interfaces are configured to provide one or more inputs to the one or more application processing cores and the one or more integrity processing cores; wherein the integrity application includes a set of commands, wherein the set of commands use the one or more inputs to exercise the first instruction set architecture used by the one or more safety critical applications; wherein the one or more application processing cores and the one or more integrity processing cores are asynchronized, wherein the integrity memory is configured to provide temporal buffering between the one or more integrity application outputs and the one or more integrity monitor outputs when the integrity monitor compares the one or more integrity application outputs and the one or more integrity monitor outputs; wherein the integrity memory maintains a strike counter, wherein the integrity monitor causes the strike counter to increment one or more strikes when the integrity monitor detects the mis-compare.

In some aspects, the techniques described herein relate to a system-on-chip including: one or more application processing cores with a first instruction set architecture, wherein the one or more application processing cores are configured to execute an integrity application and one or more safety critical applications, wherein the integrity application is configured to generate one or more integrity application outputs, wherein the one or more safety critical applications do not include application specific independent integrity checks capable of detection of a common mode failure; one or more integrity processing cores with a second instruction set architecture, wherein the first instruction set architecture and the second instruction set architecture are different, wherein the one or more integrity processing cores are configured to execute an integrity monitor, wherein the integrity monitor is configured to generate one or more integrity monitor outputs, wherein the integrity monitor is configured to compare the one or more integrity application outputs and the one or more integrity monitor outputs to detect one of a valid-compare or a mis-compare; an integrity memory; and one or more communication interfaces, wherein the one or more communication interfaces are configured to provide one or more inputs to the one or more application processing cores and the one or more integrity processing cores; wherein the integrity application includes a set of commands, wherein the set of commands use the one or more inputs to exercise the first instruction set architecture used by the one or more safety critical applications; wherein the one or more application processing cores and the one or more integrity processing cores are asynchronized, wherein the integrity memory is configured to provide temporal buffering between the one or more integrity application outputs and the one or more integrity monitor outputs when the integrity monitor compares the one or more integrity application outputs and the one or more integrity monitor outputs; wherein the integrity memory maintains an integrity application output buffer and an integrity monitor output buffer; wherein the integrity memory is configured to provide temporal buffering by the integrity application output buffer and the integrity monitor output buffer; wherein the integrity memory is configured to store the one or more integrity application outputs and the one or more integrity monitor outputs in the integrity application output buffer and the integrity monitor output buffer, respectively; wherein the integrity monitor is configured to compare the one or more integrity application outputs stored in the integrity application output buffer and the one or more integrity monitor outputs stored in the integrity monitor output buffer to detect one of the valid-compare or the mis-compare.

In some aspects, the techniques described herein relate to a system-on-chip, wherein the integrity monitor detects the valid-compare when at least one of the one or more integrity application outputs in the integrity application output buffer match at least one of the one or more integrity monitor outputs in the integrity monitor output buffer; wherein the integrity monitor detects the mis-compare when none of the one or more integrity application outputs in the integrity application output buffer match the one or more integrity monitor outputs in the integrity monitor output buffer.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 2 depicts a table of an example performance of the system-on-chip, in accordance with one or more embodiments of the present disclosure.

FIG. 4D depicts a table of an example performance of the system-on-chip at a cycle eight, in accordance with one or more embodiments of the present disclosure.

DETAILED DESCRIPTION

Figure 1:
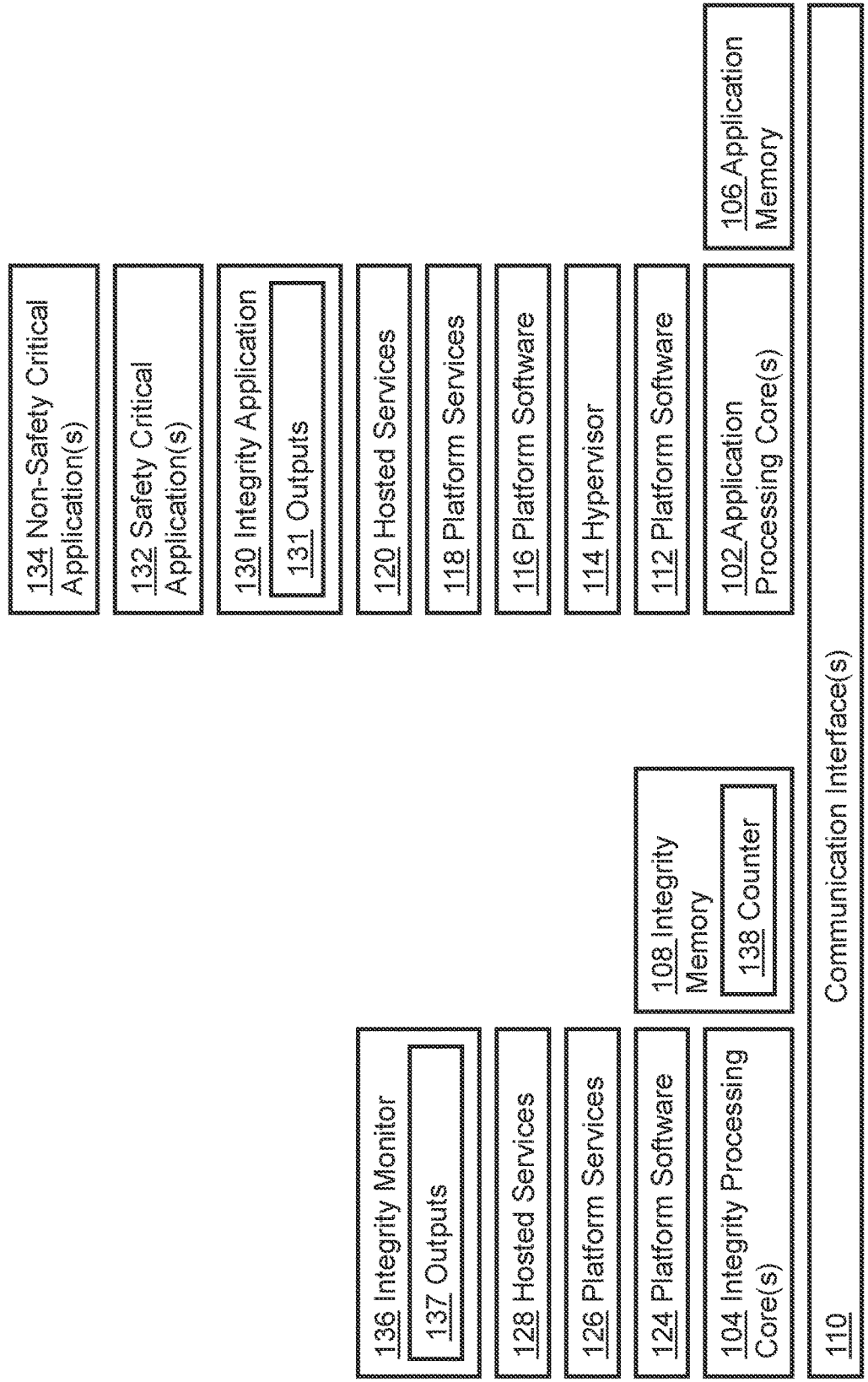
FIG. 1 depicts a system-on-chip with a strike counter, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings. A system-on-chip may include application processing cores which execute safety critical applications and an integrity application. The system-on-chip may also include integrity processing cores which execute an integrity monitor. The integrity monitor may compare integrity application outputs and integrity monitor outputs to detect if the processing cores have experienced a common mode fault. The integrity processing cores may perform temporal monitoring to accommodate time-asynchronization's between the application processing cores and the integrity processing cores.

U.S. Pat. No. 10,719,356B1, titled "High integrity multicore computing environment with granular redundant multi-threading"; U.S. Pat. No. 11,224,094B1, titled "Shared networking infrastructure with multi-link channel bonding"; U.S. Pat. No. 10,114,777B1, titled "I/O synchronization for high integrity multicore processing"; U.S. Pat. No. 10,242,179B1, titled "System-on-chips"; U.S. Pat. No. 11,494,256B2, titled "Memory scanning operation in response to common mode fault signal"; U.S. Pat. No. 11,591,092B2, titled "Dissimilar microcontrollers for outflow valve"; U.S. Pat. No. 9,454,418B1, titled "Method for testing capability of dissimilar processors to achieve identical computations"; are incorporated herein by reference in the entirety.

FIG. 1 depicts a system-on-chip 100, in accordance with one or more embodiments of the present disclosure. The system-on-chip 100 may include components such as, but not limited to, application processing cores 102, integrity processing cores 104, application memory 106, integrity memory 108, communication interfaces 110, graphics, memory, and the like.

The system-on-chip 100 may be a heterogenous, multi-core system-on-chip. The system-on-chip 100 may include heterogeneous processing cores. For example, the system-on-chip 100 may include the application processing cores 102 and the integrity processing cores 104. The integrity processing cores 104 may be dissimilar from the application processing cores 102. The application processing cores 102 and/or the integrity processing cores 104 may include a first core type (e.g., core type 1) and a second core type (e.g., core type 2), respectively. As used herein, a core type (e.g., first core type and/or second core type) may refer to an instruction set architecture (ISA). In this regard, the application processing cores 102 may include a first instruction set architecture and the integrity processing cores 104 may include a second instruction set architecture, where the first instruction set architecture and the second instruction set architecture are different.

The first core type and/or the second core type may include any instruction set architecture, so long as the first instruction set architecture and the second instruction set architecture are different. The instruction set architectures may include any architectural complexity such as, but not limited to, reduced instruction set architectures (RISC), complex instruction set architectures (CISC), and the like. For example, the first instruction set architecture and/or the second instruction set architecture may include x86, extensions of x86, ARM (e.g., AARCH64, A64, AARCH32, A32, T32), PowerPC, Power ISA, RISC-V, MIPS, ARC, MicroBlaze, OpenRISC, SPARC, SuperH, DEC Alpha, ETRAX CRIS, and the like.

The application processing cores 102 and the integrity processing cores 104 may include an architecture bit width. The architecture bit width may refer to bits stored in registers of the application processing cores 102 and the integrity processing cores 104. The architecture bit width may include any integer number of bits. For example, the architecture bit width may be 16-bit, 24-bit, 32-bit, 64-bit or the like. The architecture bit width of the application processing cores 102 may or may not be the same as the integrity processing cores 104.

The application processing cores 102 and/or the integrity processing cores 104 may experience one or more faults. For example, the application processing cores 102 and/or the integrity processing cores 104 may experience transient faults and/or common mode faults.

The transient faults may include single event upsets. The transient faults may occur when ionizing particles strike the application processing cores 102 and/or the integrity processing cores 104.

The common mode faults may occur where identical of the application processing cores 102 fail in in the same way for the same reason. By way of another instance, the common mode faults may occur where identical of the integrity processing cores 104 fail in the same way for the same reason. The common mode faults may or may not be detected during design and testing of the processing cores. The application processing cores 102 and/or the integrity processing cores 104 may experience the common mode faults due to an instruction set architecture (ISA) of the application processing cores 102 and/or an instruction set architecture the integrity processing cores 104. The application processing cores 102 and/or the integrity processing cores 104 may not experience the same common mode faults due to the application processing cores 102 and the integrity processing cores 104 being heterogeneous. For instance, the application processing cores 102 may not experience a common mode fault when the integrity processing cores 104 experience the common mode fault, and vice versa.

The application processing cores 102 and/or the integrity processing cores 104 may include one or more processing cores. For example, the application processing cores 102 and/or the integrity processing cores 104 may include a single of the application processing cores 102 and the integrity processing cores 104, respectively. By way of another example, the application processing cores 102 and/or the integrity processing cores 104 may include a dual lockstep pair of the application processing cores 102 and/or a dual lockstep pair of the integrity processing cores 104, respectively. The dual lockstep pair of the application processing cores 102 may be synchronized and/or the dual lockstep pair of the integrity processing cores 104 may be synchronized for detecting the transient faults with the application processing cores 102 and/or the integrity processing cores 104, respectively. By way of another example, the application processing cores 102 and/or the integrity processing cores 104 may include N-modular redundancy with N of the application processing cores 102 and/or N of the integrity processing cores 104, respectively, where N is an integer. For instance, N may be the integer three, such that triple-modular redundancy is provided. The application processing cores 102 and/or the integrity processing cores 104 may include triple-modular redundancy with three of the application processing cores 102 and/or triple modular redundancy with three of the integrity processing cores 104, respectively. The N-modular redundancy may enable detecting the transient faults. The application processing cores 102 and the integrity processing cores 104 may include any type of processing cores, so long as the architectures of the application processing cores 102 and the integrity processing cores 104 are dissimilar. For example, the application processing cores 102 may include any number of homogeneous application processing cores and the integrity processing cores 104 may include any number of homogenous processing cores, so long as the application processing cores 102 and the integrity processing cores 104 are heterogeneous.

Detecting the transient faults may not enable detecting the common mode faults of the application processing cores 102 and/or the integrity processing cores 104. Like processing cores may each experience the same common mode faults. Thus, the dual lock step and/or N-modular redundancy may not enable detecting the common mode faults.

The integrity processing cores 104 may be power isolated from the application processing cores 102.

The application processing cores 102 may execute one or more applications, such as the integrity application 130, the safety critical applications 132, and/or the non-safety critical applications 134.

The application processing cores 102 may execute the integrity application 130, the safety critical applications 132, and/or the non-safety critical applications 134 as independent partitions. For example, the integrity application 130 may be executed as an independent partition on the application processing cores 102.

The safety critical applications 132 and/or the non-safety critical applications 134 may be hosted applications. In this regard, the safety critical applications 132 and/or the non-safety critical applications 134 may be software that is running on another provider's infrastructure. For example, the safety critical applications 132 and/or the non-safety critical applications 134 may be software running on the system-on-chip 100 that is not installed or considered part of aircraft type design.

The safety critical applications 132 may include, but are not limited to, flight controls, flight display applications, and the like. The safety critical applications 132 may require high-integrity computations such as those used in flight critical avionics systems.

The safety critical applications 132 and/or the non-safety critical applications 134 may or may not include application specific independent integrity checks capable of detection of the common mode failures. For example, the safety critical applications 132 and/or the non-safety critical applications 134 may not include logic for monitoring the common mode failures of the application processing cores 102. Software developers may not be required to incorporate integrity-monitoring functionality at the application level. Instead, the software developers may provide the safety critical applications 132 to operate on a general-purpose computing platform provided by the application processing cores 102.

Applications may be selectively categorized as safety critical applications 132 or non-safety critical applications 134 to control whether the integrity application 130 is utilized. In this regard, the resources of the system-on-chip may be efficiently utilized. The integrity application 130 may be executed on any of the application processing cores 102 which also execute the safety critical applications 132. The integrity application 130 may be an independent application partition, running an independent set of commands, that will be executed by any of the application processing cores 102 that is also hosting the safety critical applications 132. The integrity application 130 may generate the integrity application outputs 131 without imposing functional requirements for the safety critical applications 132 and/or the non-safety critical applications 134.

The system-on-chip 100 may further include one or more of the application processing cores 102 which execute the non-safety critical applications 134 but not the safety critical applications 132 (not depicted). The integrity application 130 may or may not be executed on the application processing cores 102 which execute the non-safety critical applications 134 but not the safety critical applications 132. For example, the application processing cores 102 may not need to execute the integrity application 130, because a higher integrity may not be needed for the non-safety critical applications 134.

The integrity processing cores 104 may be an independent monitor for monitoring the application processing cores 102 for common mode faults. The integrity processing cores 104 may monitor the integrity of the application processing cores 102. The integrity processing cores 104 may execute the integrity monitor 136. Thus, the integrity application 130 and the integrity monitor 136 may be hosted on dissimilar processing cores within the system-on-chip 100.

The system-on-chip 100 may include communication interfaces 110. The communication interfaces 110 may provide inputs and outputs (I/O) for the system-on-chip 100. For example, the communication interfaces 110 may provide inputs and outputs (I/O) to the application processing cores 102 and/or the integrity processing cores 104. Common input data may be routed to the integrity application 130 and the integrity monitor 136 through the communication interfaces 110.

The system-on-chip 100 may include a first of the communication interfaces 110 for the application processing cores 102 and a second of the communication interfaces 110 for the integrity processing cores 104, where the first of the communication interfaces 110 and the second of the communication interfaces 110 are different. The application processing cores 102 and integrity processing cores 104 may include independent data paths to further minimize the potential for undetected design faults.

The inputs may include, but are not limited to, air data, position, altitude, attitude, engine data, flight controls, fire warning, cabin pressure, engine thrust, exhaust gas temperature, speed (e.g., indicated airspeed, a true airspeed, and groundspeed), angle of attack, pitch angle, flight path angle, acceleration, rate of descent, and the like.

The integrity application 130 and/or the integrity monitor 136 may include a set of commands. The set of commands may use the inputs to exercise the first instruction set architecture used by the safety critical applications 132. Each of the application processing cores 102 may perform one or more mathematical operations on the inputs. The commands may exercise the instructions from the instructions set architecture used by the safety critical applications 132 and the registers used with those instructions. The registers used for any specific version of the safety critical applications 132 may be consistent (or static). Using the same safety critical input data sources and performing typical safety critical operations within the integrity application 130 may provide a high degree of coverage of the instruction interactions with registers. This coverage can be increased by having the integrity application 130 apply various techniques, over time, to offset the nominal register usage in the integrity application 130.

The types of commands may be based on the intended application of the flight system employing the system-on-chip. For example, the system-on-chip 100 may be used in an Engine Indication and Crew Alerting System (EICAS) or Autopilot system such that the commands may include commands encountered by the EICAS or the Autopilot system during flight operations.

The integrity application 130 and/or the integrity monitor 136 may include an executable instruction set. The executable instruction set may be, but is not required to be, assembly code. The executable instruction set may include highly customized sets of executable instructions. The executable instruction set may be selected from a list of predetermined executable instruction sets (e.g. randomly or based on a rotation through the list). The executable instruction set may be dynamically generated based on a constrained-random mix of instructions. Full coverage of the first instruction set architecture can be verified by analysis of the design constraints or by inspection of the resulting assembly instructions of both the safety critical applications 132 and the commands.

The integrity application 130 and/or the integrity monitor 136 may generate integrity application outputs 131 and integrity monitor outputs 137, respectively. The integrity application outputs 131 and the integrity monitor outputs 137 may be generated from the set of commands. The integrity application outputs 131 and the integrity monitor outputs 137 may be from a defined set of commands of the safety critical applications 132 that are executed on the application processing cores 102. The integrity application outputs 131 and the integrity monitor outputs 137 may include outputs in response to the application processing cores 102 and the integrity processing cores 104 executing the executable instruction set. The integrity application 130 and the integrity monitor 136 may include the same commands to generate the integrity application outputs 131 and the integrity monitor outputs 137, respectively. However, the integrity application 130 and the integrity monitor 136 may use different instruction set architectures to generate the integrity application outputs 131 and the integrity monitor outputs 137. For example, the integrity application 130 may use the instruction set architecture to generate the integrity application outputs 131 and the integrity monitor 136 may use the second instruction set architecture to generate the integrity application outputs 131. The integrity application 130 and the integrity monitor 136 may use different instruction set architectures to generate the integrity application outputs 131 and the integrity monitor outputs 137 thereby avoiding common mode faults in which a true fault is not detected when both the integrity application 130 and the integrity monitor 136 provide a fault in the same manner.

The integrity application 130 and the integrity monitor 136 may or may not directly evaluate the computations of the safety critical applications 132. For example, the integrity application 130 and the integrity monitor 136 may not directly evaluate the computations of the safety critical applications 132.

The integrity application outputs 131 and the integrity monitor outputs 137 may include any type of outputs. For example, the integrity application outputs 131 and the integrity monitor outputs 137 may include, but are not limited to, a direct data output from the computations of the executable instruction set and/or a computed signature of the direct data output. The direct data output may include bits output by executing the commands of the executable instruction set. The computed signature may include a hash value or another cryptographic signature. The hash value may be computed from the direct data output using a cryptographic hash function. The computed signature may be a smaller length than the direct data output.

The application processing cores 102 may send the integrity application outputs 131 to the integrity processing cores 104. The integrity processing cores 104 may receive the integrity application outputs 131 from the application processing cores 102. The system-on-chip 100 may include a communication channel between the integrity application 130 and the integrity monitor 136. The communication channel may provide the integrity application outputs 131 from the integrity application 130 to the integrity monitor 136.

The integrity monitor 136 may compare the integrity application outputs 131 and the integrity monitor outputs 137. The integrity monitor 136 may compare the integrity application outputs 131 and the integrity monitor outputs 137 to monitor the application processing cores 102 for common mode failures. The integrity application outputs 131 and the integrity monitor outputs 137 may be integrity comparison data to be compared to determine the integrity of the application processing cores 102. The integrity monitor 136 may test the functionality of the application processing cores 102 by verifying the integrity application outputs 131 with the integrity monitor outputs 137.

The integrity application outputs 131 and the integrity monitor outputs 137 may be compared to detect a valid-compare and/or a mis-compare. The valid-compare may be where the integrity application outputs 131 and the integrity monitor outputs 137 do match. The mis-compare may be where the integrity application outputs 131 and the integrity monitor outputs 137 do not match.

The integrity monitor 136 may compare the integrity application outputs 131 and the integrity monitor outputs 137 to detect the valid-compare and/or the mis-compare by an exact match. The exact match may include detecting the integrity application outputs 131 and the integrity monitor outputs 137 match exactly. For example, the bits of the integrity application outputs 131 may be compared bit-for-bit with the bits of the integrity application outputs 131. By way of another example, the hash of the integrity application outputs 131 may be compared with the hash of the integrity application outputs 131. The exact match may provide the highest level of integrity to the application processing cores 102.

The integrity monitor 136 may compare the integrity application outputs 131 and the integrity monitor outputs 137 to detect the valid-compare and/or the mis-compare by a tolerance match. The tolerance match may indicate the integrity application outputs 131 and the integrity monitor outputs 137 are within tolerance of each other. The valid match may be found when comparing the integrity application outputs 131 and the integrity monitor outputs 137 when the integrity monitor outputs 137 are within a tolerance of the integrity application outputs 131. The tolerance may include any value, such as, but not limited to, within 99.9%, within 99.5%, within 99% or the like. The tolerance may also include a match of all but a set number of least significant values (e.g., least significant bits, least significant digits, and the like). For example, the match may be within tolerance if the integrity application outputs 131 and the integrity monitor outputs 137 match all but one, two, or more of the least significant values. The tolerance may increase the analysis effort and certification risks of the system-on-chip 100.

The integrity monitor 136 may compare the integrity application outputs 131 and the integrity monitor outputs 137 to detect the valid-compare and/or the mis-compare by the exact match or by tolerance match where the integrity application outputs 131 and the integrity monitor outputs 137 are the direct data output.

Similarly, the integrity monitor 136 may compare the integrity application outputs 131 and the integrity monitor outputs 137 to detect the valid-compare and/or the mis-compare by the exact match or by tolerance match where the integrity application outputs 131 and the integrity monitor outputs 137 are the cryptographic signature. The integrity application 130 and/or the integrity monitor 136 may perform one or more processing steps when generating integrity application outputs 131 and the integrity monitor outputs 137 to enable the tolerance match. The integrity application 130 and/or the integrity monitor 136 may remove one or more of the least significant values prior to generating the computed signatures. The valid-match of the integrity application outputs 131 and the integrity monitor outputs 137 may then indicate the tolerance match, where the tolerance is based on the number of the least significant values which are removed prior to generating the computed signatures.

The mis-compare may be stored in the integrity memory 108. For example, the mis-compare may be stored in the integrity memory 108 for further processing. All faults may be logged (e.g. in a log file in a persistent storage device) for subsequent debugging or diagnostics.

Comparing the integrity application outputs 131 and the integrity monitor outputs 137 may enable detecting the transient faults and/or the common mode faults. The mis-compare between the integrity application outputs 131 and the integrity monitor outputs 137 may indicate a fault. For example, a single mis-compare between the integrity application outputs 131 and the integrity monitor outputs 137 may indicate the transient fault. Persistent mis-compares between the integrity application outputs 131 and the integrity monitor outputs 137 may indicate a fault such as the common mode faults or another type of fault. Thus, the integrity processing cores 104 may detect the common mode faults that could lead to hazardous system outputs.

The integrity application 130 and the integrity monitor 136 may provide high-integrity for the safety critical applications 132. The dissimilar monitoring may provide assurance that the use of the application processing cores 102 does not result in the common mode fault. When the dissimilar cores come up with the same output, then the output may be trusted such that there is no common mode fault. Comparing the integrity application outputs 131 with the integrity monitor outputs 137 may enable detecting the common mode faults impacting the safety critical applications 132 executed by the application processing cores 102. The assessment of the real-time behavior of the application processing cores 102 using the same dynamically changing safety critical data used by the safety critical applications 132 may reduce a probability of the common mode faults within the application processing cores 102.

The application processing cores 102 may include an undetected fault rate. The undetected fault rate may be a ratio of undetected computations resulting in a fault to total computations, associated with the execution of the safety critical applications 132. The integrity monitor 136 may detect the common mode faults in the application processing cores 102 such that the application processing cores 102 may be high-integrity by the undetected fault rate. The integrity monitor 136 may cause the safety critical applications 132 to achieve the undetected fault rate. The system-on-chip 100 may execute the safety critical applications 132 with the undetected fault rate smaller than an integrity specification that may be selected based on the demands of the safety critical applications 132. Additionally, the integrity application 130 and the integrity monitor 136 may enable the safety critical applications 132 to achieve the undetected fault rate without the safety critical applications including an integrated integrity monitoring function.

The undetected fault rate may include any value. The undetected fault rate may be less than 1E-7 per hour. For example, the undetected fault rate of the application processing cores 102 may be less than 1E-8 per hour. By way of another example, the undetected fault rate of the application processing cores 102 may be 1E-9 per hour or less. By way of another example, the undetected fault rate of the application processing cores 102 may be 1E-10 per hour or less. The specific value of the undetected fault rate may vary based on the demands of the system-on-chip 100.

Persistent mis-compares between the integrity application outputs 131 and the integrity monitor outputs 137 may also indicate time asynchronization between the application processing cores 102 and the integrity processing cores 104. The application processing cores 102 and the integrity processing cores 104 may be asynchronized. For example, the integrity processing cores 104 may be asynchronized to the application processing cores 102. The application processing cores 102 and the integrity processing cores 104 may be asynchronized by not being synchronized to a common clock signal. For example, the application processing cores 102 may be on a first clock signal and the integrity processing cores 104 may be on a second clock signal, where the first clock signal is different than the second clock signal. The application processing cores 102 and the integrity processing cores 104 may experience a latency difference due to the different clock signals. The application processing cores 102 and the integrity processing cores 104 may be asynchronized due to the latency difference. For example, with notionally 20 cycles per second (so 20 output sets per second) the integrity application outputs 131 may not match with the integrity monitor outputs 137 even if the inputs and scheduling tasks are designed to provide consistent frame sets.

The integrity memory 108 may provide temporal buffering between the integrity application outputs 131 and the integrity monitor outputs 137 when the integrity monitor 136 compares the integrity application outputs 131 and the integrity monitor outputs 137. The integrity monitor 136 may provide temporal buffering between the integrity application outputs 131 and the integrity monitor outputs 137 allowing the integrity monitor 136 to detect the mis-compare without triggering the common mode faults. The temporal buffering of the integrity application outputs 131 and/or the integrity monitor outputs 137 may enable the integrity monitor 136 to compare between the dissimilar processing cores without requiring data and processing synchronization between the dissimilar processing cores. The temporal buffering may greatly reduce input and scheduling design constraints while mitigating common-mode faults of a non-transient nature.

The integrity memory 108 may maintain the strike counter 138. The integrity memory 108 may be configured to provide the temporal buffering by the strike counter 138. The integrity memory 108 may maintain a dedicated of the strike counter 138 for each of the application processing cores 102.

The integrity monitor 136 may cause the strike counter 138 to increment strikes when the integrity monitor 136 detects the mis-compare. The integrity monitor 136 may cause the strike counter 138 to decrement strikes when the integrity monitor 136 detects the valid-compare. The integrity monitor 136 may increment and/or decrement the strikes in the strike counter 138 by any integer value. The integer value by which the integrity monitor 136 increments the strikes in strike counter 138 and the integer value by which the integrity monitor 136 decrements the strikes in strike counter 138 may or may not be the same.

The integrity monitor 136 may cause the strike counter 138 to increment more strikes for each mis-compare than decrementing strikes for each valid-compare. For example, the integrity monitor 136 may cause the strike counter 138 to increment and decrement the strikes in a two-up, one-down configuration. In the two-up, one-down configuration the integrity monitor 136 may increment the strike counter 138 by two when detecting the mis-compare and decrement the strike counter 138 by one when detecting the valid-compare. The two-up, one-down configuration may provide more weighting to the mis-compares than the valid-compares.

In embodiments, the integrity monitor 136 may cause the strike counter 138 to decrement to zero when the integrity monitor 136 detects the valid-compare. In this regard, the strike counter 138 may be reset anytime there is a match between the integrity application outputs 131 and the integrity monitor outputs 137.

The integrity monitor 136 may increment the strike counter 138 up to a strike counter threshold. The strike counter threshold may include any integer value. For example, the strike counter threshold may include ten or more strikes. The strike counter threshold may be set to limit the potential duration of a potentially erroneous output to 1 second. The integrity monitor 136 may detect a fault at the strike counter threshold. The integrity monitor 136 may detect the fault upon the strikes in the strike counter 138 reaching the strike counter threshold. The fault may include the common mode fault or another fault.

The integrity monitor 136 may be configured to perform one or more actions upon detecting the common mode fault. The integrity monitor 136 may reset a portion of the system-on-chip 100 such as, but not limited to the application processing cores 102 and/or the integrity processing cores 104. By way of another example, the system-on-chip 100 may be reset. The application processing cores 102 and/or the integrity processing cores 104 may be reset when the integrity monitor 136 detects the common mode fault. For example, the cores of the system-on-chip 100 may be reset when the comparison detects the mis-match and/or when strike counter 138 is at the strike counter threshold. The cores of the system-on-chip 100 may also be reset if the integrity monitor 136 fails to reset an independent watchdog (IWDG) monitor of the system-on-chip. One or more virtual machines within the system-on-chip 100 may also be reset. For example, the virtual machines may be rebooted up to a maximum number of times before rebooting the system-on-chip 100.

In some embodiments, a common mode fault may be detected between a first of the application processing cores 102 and the integrity processing cores 104, with a remainder of the application processing cores 102 and the integrity processing cores 104 not including the common mode fault. The first of the application processing cores 102 and the integrity processing cores 104 may be reset while the remainder of the application processing cores 102 remain functional. Resetting only the first of the application processing cores 102 and the integrity processing cores 104 may cause the remainder of the application processing cores 102 to lose the integrity monitor 136 from the integrity processing cores 104. The remainder of the application processing cores 102 may operate at a lower integrity but may be enabled to continue operation.

The application memory 106 and/or the integrity memory 108 may include registers. The application memory 106 and/or the integrity memory 108 may include a design assurance level A (DAL-A). For example, the application memory 106 and/or the integrity memory 108 may include DO178C design assurance level (DAL) A, a DO254 DAL A, or the like.

The integrity memory 108 may be independent from the application memory 106. For example, the integrity memory 108 may include register offsets from the application memory 106.

The application processing cores 102 may be configured to execute a platform software 112. The platform software 112 may include boot, boot operating system (OS), boot real-time operating system (RTOS), drivers, and the like.

The application processing cores 102 may be configured to execute a hypervisor 114. The hypervisor 114 may host a platform software 116. The hypervisor 114 may further host any number of partitions of the platform software 116. The safety critical applications 132 may be constrained by the hypervisor 114. The constraints may include limited or no access to specific subsets of the instruction set architecture of the application processing cores 102. For example, if the application processing cores 102 are an ARM A series core, the safety critical applications 132 may be constrained to use the ARM A-profile A64 base instruction set, which has about 500 uniquely defined instructions. The ARM A-profile A64 base instruction set can be further constrained by eliminating any instructions that would not be available to applications during flight operations. For the safety critical applications 132, the instructions to be removed may include debug and memory related instructions, which further reduces the number of instructions of interest for the analysis.

The platform software 116 may include an operating system (OS) and/or real-time environments (RTE). The platform software 116 may be in a user-accessible application layer.

The platform software 116 may execute platform services 118, hosted services 120, and/or applications (e.g., the integrity application 130, the safety critical applications 132, and/or the non-safety critical applications 134).

The platform software 116 may be dedicated to a single application and/or multiple applications. Further, different tasks of the applications may be provided dedicated partitions having dedicated fixed resources (e.g. memory blocks). The platform software 116 may include one or more integrity-enabled guest operating systems for executing the applications. The integrity-enabled guest operating systems may be dedicated to the safety critical applications 132 or may additionally execute the non-safety critical applications 134 not requiring integrity monitoring. The platform software 116 may also include non-critical guest operating systems for exclusively executing non-critical applications. Accordingly, the platform software 116 may include any combination of one or more operating systems for executing critical or non-critical applications. Further, the platform software 116 may provide (e.g. to a software developer) an option of executing a particular application as the safety critical applications 132 requiring integrity monitoring by the integrity application 130 or the non-safety critical applications 134 not requiring integrity monitoring.

The hypervisor 114 may allocate resources (e.g. the application processing cores 102 or the application memory 106) to the platform software 116. For example, the hypervisor 114 may operate in an Asymmetric Multi-core Processing (AMP) mode to allocate the platform software 116 to different of the application processing cores 102 configured with a multi-core architecture. By way of another example, the hypervisor 114 may operate in a Symmetric Multi-core Processing (SMP) mode to divide processing power between multiple of the application processing cores 102 configured with a homogeneous multi-core architecture.

The integrity processing cores 104 may be configured to execute a platform software 124. The platform software 124 may include an operating system (OS) and/or real-time environments (RTE). The platform software 116 may be in a user-inaccessible application layer.

The platform software 124 may execute platform services 126, hosted services 128, and/or the integrity monitor 136.

The integrity application 130 and/or the integrity monitor 136 may be executed at periodic intervals. The scheduling of the periodic intervals may occur at any level of the system-on-chip 100. For example, the integrity processing cores 104 may provide signals (e.g. interrupts) to the application processing cores 102 to schedule the intervals. By way of another example, the hypervisor 114 may provide signals to the integrity application 130 to schedule the intervals. Scheduling and redundant operations on each of the application processing cores 102 may be managed by the hypervisor 114.

FIG. 2 depicts a table 200 of an example performance of the system-on-chip 100, in accordance with one or more embodiments of the present disclosure. In this example, the integrity application outputs 131 and the integrity monitor outputs 137 are in the form of 16-digit alphanumeric values, although this is not intended to be limiting. In this example, the integrity monitor 136 increments and decrements the strike counter 138 in a two-up, one-down configuration where the strike counter 138 is incremented by two upon detecting a mis-compare and decremented by one upon detecting a valid-compare, although this is not intended to be limiting.

The system-on-chip 100 may start from an initial cycle zero with the strike counter 138 at zero.

At cycle one, the integrity application outputs 131 and the integrity monitor outputs 137 may be compared to detect a mis-compare. The strike counter 138 may be increment by two upon detecting the mis-compare such that the strike counter 138 is at two.

At cycle two, the integrity application outputs 131 and the integrity monitor outputs 137 may be compared to detect a valid-compare. The strike counter 138 may be decrement by one upon detecting the valid-compare such that the strike counter 138 is at one.

At cycle three, the integrity application outputs 131 and the integrity monitor outputs 137 may be compared to detect a mis-compare. The strike counter 138 may be increment by two upon detecting the mis-compare such that the strike counter 138 is at three.

The comparisons may continue up to a cycle N, where N is an integer. At cycle number N, the integrity application outputs 131 and the integrity monitor outputs 137 may be compared to detect a mis-compare. The strike counter 138 may be increment by two upon detecting the mis-compare such that the strike counter 138 is at the strike counter threshold. The application processing cores 102, the integrity processing cores 104, and/or the system-on-chip 100 may be reset upon reaching the strike counter threshold. The reset may be back to the cycle zero.

Figure 3:
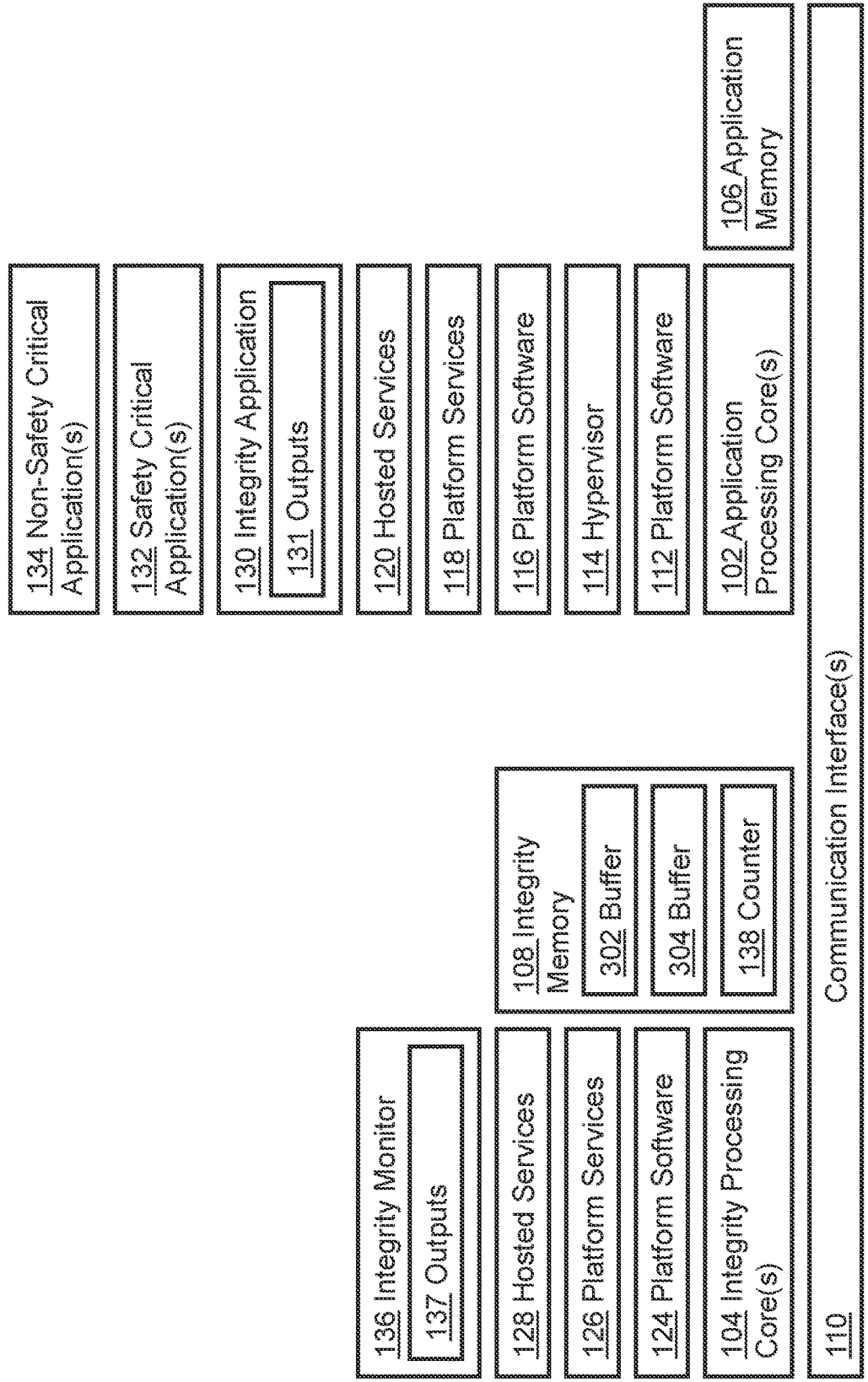
FIG. 3 depicts the system-on-chip with output buffers, in accordance with one or more embodiments of the present disclosure.
Figure 4A:
FIG. 4A depicts a table of an example performance of the system-on-chip at a cycle one, in accordance with one or more embodiments of the present disclosure.
Figure 4B:
FIG. 4B depicts a table of an example performance of the system-on-chip at a cycle six, in accordance with one or more embodiments of the present disclosure.
Figure 4C:
FIG. 4C depicts a table of an example performance of the system-on-chip at a cycle seven, in accordance with one or more embodiments of the present disclosure.
Figure 4E:
FIG. 4E depicts a table of an example performance of the system-on-chip at a cycle N, in accordance with one or more embodiments of the present disclosure.

FIG. 3 depicts the system-on-chip 100, in accordance with one or more embodiments of the present disclosure. The integrity memory 108 may maintain the integrity application output buffer 302 and the integrity monitor output buffer 304. The integrity memory 108 may be configured to provide the temporal buffering by the integrity application output buffer 302 and the integrity monitor output buffer 304.

The integrity memory 108 may maintain a dedicated of the integrity application output buffer 302 and the integrity monitor output buffer 304 for each of the application processing cores 102.

The integrity memory 108 may store the integrity application outputs 131 and the integrity monitor outputs 137 in the integrity application output buffer 302 and the integrity monitor output buffer 304, respectively.

The integrity application output buffer 302 and the integrity monitor output buffer 304 may be circular buffers. The integrity application output buffer 302 and the integrity monitor output buffer 304 may follow a first-in, first-out scheme for storing the integrity application outputs 131 and the integrity monitor outputs 137. Once the buffer is full (i.e., each element in the buffer includes one of the outputs) and a new output is received, the oldest output in the buffer may be overwritten. Thus, the buffer may be updated with the newest outputs while maintaining a reduced memory and processing requirement. The circular buffer may include one or more pointers for keeping track of the positions in the buffer.

The integrity application output buffer 302 and the integrity monitor output buffer 304 may include a fixed-sized buffer. The size of the buffer may include any suitable size, such as, but not limited to, from six to one-hundred, or more. The size of the buffer may indicate a duration of time for which the outputs are stored. For example, the integrity application output buffer 302 and the integrity monitor output buffer 304 may be sized to store up to one-second or more of the integrity application outputs 131 and the integrity monitor outputs 137, respectively. The size of the integrity application output buffer 302 may be the same or different than the size of the integrity monitor output buffer 304.

The integrity monitor 136 may be configured to compare the integrity application outputs 131 stored in the integrity application output buffer 302 and the integrity monitor outputs 137 stored in the integrity monitor output buffer 304. The integrity monitor 136 compare the integrity application outputs 131 stored in the integrity application output buffer 302 and the integrity monitor outputs 137 stored in the integrity monitor output buffer 304 to detect the mis-match and/or the valid-match.

The integrity monitor 136 may detect the valid-compare when at least one of the integrity application outputs 131 in the integrity application output buffer 302 match at least one of the integrity monitor outputs 137 in the integrity monitor output buffer 304. The integrity monitor 136 may detect the mis-compare when none of the integrity application outputs 131 in the integrity application output buffer 302 match the integrity monitor outputs 137 in the integrity monitor output buffer 304. Comparing the integrity application outputs 131 in the integrity application output buffer 302 with the integrity monitor outputs 137 in the integrity monitor output buffer 304 may enable the integrity monitor 136 to account for time-shifts in the integrity application outputs 131 and/or in the integrity monitor outputs 137 due to clock a-synchronicity without falsely indicating the common mode fault.

The system-on-chip 100 may continue operations when the integrity monitor 136 detects the valid-compare.

The integrity monitor 136 may cause the system-on-chip 100 to reset if the integrity monitor detects the mis-compare. For example, the system-on-chip 100 may be reset due to the common mode fault. In this example, the integrity monitor 136 may cause the system-on-chip 100 to reset if the integrity monitor detects the mis-compare without the use of the strike counter 138.

The integrity monitor 136 may also cause the strike counter 138 to accumulate strikes when the integrity monitor 136 detects the mis-compare. The system-on-chip 100 may continue operations until the strike counter 138 reaches the strike counter threshold, as described above.

FIGS. 4A-4E depict a table 400 of an example performance of the system-on-chip 100, in accordance with one or more embodiments of the present disclosure. In this example, the integrity application outputs 131 and the integrity monitor outputs 137 are in the form of 16-digit alphanumeric values, although this is not intended to be limiting. In this example, the size of the integrity application output buffer 302 and the size of the integrity monitor output buffer 304 are each six, although this is not intended to be limiting. In this example, the integrity monitor 136 increments and decrements the strike counter 138 in a two-up, one-down configuration where the strike counter 138 is incremented by two upon detecting a mis-compare and decremented by one upon detecting a valid-compare, although this is not intended to be limiting.

At cycles one through six, the integrity application outputs 131 and the integrity monitor outputs 137 may be compared to detect a valid-compare between the row one of the integrity application output buffer 302 and row one of the integrity monitor output buffer 304. The strike counter 138 may remain at zero upon detecting the valid-compare.

At cycle seven, the integrity application outputs 131 and the integrity monitor outputs 137 may be compared to detect a mis-compare. The strike counter 138 may be increment by two upon detecting the mis-compare such that the strike counter 138 is at one.

At cycle eight, the integrity application outputs 131 and the integrity monitor outputs 137 may be compared to detect a valid-compare. The strike counter 138 may be decrement by one upon detecting the valid-compare such that the strike counter 138 is at one.

The comparisons may continue up to a cycle N, where N is an integer. At cycle number N, the integrity application outputs 131 and the integrity monitor outputs 137 may be compared to detect a mis-compare. The strike counter 138 may be increment by two upon detecting the mis-compare such that the strike counter 138 is at the strike counter threshold. The application processing cores 102, the integrity processing cores 104, and/or the system-on-chip 100 may be reset upon reaching the strike counter threshold. The reset may be back to the cycle zero.

Referring generally again to the FIGS.

Memory may include any storage medium known in the art suitable for storing program instructions executable by the processing cores. For example, the memory may include a non-transitory memory medium. By way of another example, the memory may include, but is not limited to, a read-only memory, a random-access memory, a magnetic or optical memory device (e.g., disk), a magnetic tape, a solid-state drive and the like. The memory may be one or more devices (e.g., RAM, ROM, flash memory, hard disk storage) for storing data and computer code for completing and facilitating the various user or client processes, layers, and modules described in the present disclosure. The memory may be or include volatile memory or non-volatile memory and may include database components, object code components, script components, or any other type of information structure for supporting the various activities and information structures of some inventive concepts disclosed herein. The memory may be communicably connected to the processing core and includes computer code or instruction modules for executing one or more processes described herein. The memory may include various circuits, software engines, and/or modules that cause the processing cores to execute the systems and methods described herein.

The processing cores can be implemented as a general or specific purpose processor, an application specific integrated circuit (ASIC), one or more field programmable gate arrays (FPGAs), a group of processing components, or other suitable electronic processing components.

The communication interfaces may be a wired or wireless interface configured to facilitate communications with any of the devices, components, and/or system. The communications interfaces can be configured for communication using any type of communication protocol or network, and may include hardware and software necessary to facilitate data communications as described herein. The communications interfaces may be a wired or wireless interface configured to facilitate communications with any of the devices, components, and/or system. The communications interfaces can be configured for communication using any type of communication protocol or network, and may include hardware and software necessary to facilitate data communications. For example, the communications interfaces can include ports configured for wired communication (e.g., an RJ45 or ethernet port, fiber optic or optical fiber port, etc.). The communications interfaces may include the hardware and machine-readable media sufficient to support communication over multiple channels of data communication. Data may be communicated a at a particular network layer, such as the data link layer (layer two). Data may be exchanged using any suitable communication protocol (e.g., TCP/IP, OSI, etc.) and at any suitable layer. Data may be received, such as, but no limited to ARINC664 and ARINC818 for generating a flight display.

The processing cores may include a graphics processing unit, which can be configured to retrieve electronic instructions for generating a visual representation for one or more of flight displays and execute the electronic instructions to generate the visual representation.

A module can take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the modules can include any type of component for accomplishing or facilitating achievement of the operations described herein. For example, a circuit as described herein can include one or more transistors, logic gates (e.g., NAND, AND, NOR, OR, XOR, NOT, XNOR, etc.), resistors, multiplexers, registers, capacitors, inductors, diodes, wiring, and so on), and programmable hardware devices (e.g., field programmable gate arrays, programmable array logic, programmable logic devices or the like). The modules can include a processor and one or more memory devices for storing instructions that are executable by each of the processors.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Those having skill in the art will appreciate that there are various vehicles by which processes and/or systems and/or other technologies described herein can be affected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be affected, none of which is inherently superior to the other in that any vehicle to be utilized is a choice dependent upon the context in which the vehicle will be deployed and the specific concerns (e.g., speed, flexibility, or predictability) of the implementer, any of which may vary.

The previous description is presented to enable one of ordinary skill in the art to make and use the invention as provided in the context of a particular application and its requirements. As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period. For example, the memory may be random access memory (RAM), and the results may not necessarily persist indefinitely in the memory.

It is noted herein that the one or more components of system may be communicatively coupled to the various other components of system in any manner known in the art. For example, the one or more processors may be communicatively coupled to each other and other components via a wireline connection or wireless connection.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A system-on-chip comprising:
    one or more application processing cores with a first instruction set architecture, wherein the one or more application processing cores are configured to execute an integrity application and one or more safety critical applications, wherein the integrity application is configured to generate one or more integrity application outputs;
    one or more integrity processing cores with a second instruction set architecture, wherein the first instruction set architecture and the second instruction set architecture are different, wherein the one or more integrity processing cores are configured to execute an integrity monitor, wherein the integrity monitor is configured to generate one or more integrity monitor outputs, wherein the integrity monitor is configured to compare the one or more integrity application outputs and the one or more integrity monitor outputs to detect one of a valid-compare or a mis-compare; and
    an integrity memory;
    wherein the one or more application processing cores and the one or more integrity processing cores are asynchronized, wherein the integrity memory is configured to provide temporal buffering between the one or more integrity application outputs and the one or more integrity monitor outputs when the integrity monitor compares the one or more integrity application outputs and the one or more integrity monitor outputs.

2. The system-on-chip of claim 1, wherein the integrity memory maintains a strike counter, wherein the integrity monitor causes the strike counter to increment one or more strikes when the integrity monitor detects the mis-compare.

3. The system-on-chip of claim 2, wherein the integrity monitor causes the strike counter to decrement one or more strikes when the integrity monitor detects the valid-compare.

4. The system-on-chip of claim 3, wherein the integrity monitor causes the strike counter to increment more strikes for the mis-compare than decrementing strikes for the valid-compare.

5. The system-on-chip of claim 3, wherein the integrity monitor causes the strike counter to decrement to zero when the integrity monitor detects the valid-compare.

6. The system-on-chip of claim 2, wherein the integrity monitor is configured to increment the strike counter up to a strike counter threshold; wherein the integrity monitor detects a fault at the strike counter threshold.

7. The system-on-chip of claim 1, wherein the integrity memory maintains an integrity application output buffer and an integrity monitor output buffer; wherein the integrity memory is configured to provide temporal buffering by the integrity application output buffer and the integrity monitor output buffer; wherein the integrity memory is configured to store the one or more integrity application outputs and the one or more integrity monitor outputs in the integrity application output buffer and the integrity monitor output buffer, respectively; wherein the integrity monitor is configured to compare the one or more integrity application outputs stored in the integrity application output buffer and the one or more integrity monitor outputs stored in the integrity monitor output buffer to detect one of the valid-compare or the mis-compare.

8. The system-on-chip of claim 7, wherein the integrity monitor detects the valid-compare when at least one of the one or more integrity application outputs in the integrity application output buffer match at least one of the one or more integrity monitor outputs in the integrity monitor output buffer;
wherein the integrity monitor detects the mis-compare when none of the one or more integrity application outputs in the integrity application output buffer match the one or more integrity monitor outputs in the integrity monitor output buffer.

9. The system-on-chip of claim 1, wherein at least one of:
the one or more application processing cores comprise a dual lockstep pair of the one or more application processing cores; or
the one or more integrity processing cores comprise a dual lockstep pair of the one or more integrity processing cores.

10. The system-on-chip of claim 1, wherein at least one of:
the one or more application processing cores comprise triple-modular redundancy with three of the one or more application processing cores; or
the one or more integrity processing cores comprise triple modular redundancy with three of the one or more integrity processing cores.

11. The system-on-chip of claim 1, wherein the one or more safety critical applications do not include application specific independent integrity checks capable of detection of a common mode failure.

12. The system-on-chip of claim 1, comprising one or more communication interfaces, wherein the one or more communication interfaces are configured to provide one or more inputs to the one or more application processing cores and the one or more integrity processing cores.

13. The system-on-chip of claim 12, wherein the one or more inputs comprise at least one of air data, position, altitude, attitude, engine data, flight controls, fire warning, cabin pressure, engine thrust, exhaust gas temperature, speed, angle of attack, pitch angle, flight path angle, acceleration, or rate of descent.

14. The system-on-chip of claim 12, wherein the integrity application comprises a set of commands, wherein the set of commands use the one or more inputs to exercise the first instruction set architecture used by the one or more safety critical applications.

15. The system-on-chip of claim 1, wherein the one or more integrity application outputs and the one or more integrity monitor outputs comprise a direct data output or a computed signature of the direct data output.

16. The system-on-chip of claim 1, wherein the integrity monitor is configured to compare the one or more integrity application outputs and the one or more integrity application outputs to detect one of the valid-compare or the mis-compare by one of an exact match or a tolerance match.

17. The system-on-chip of claim 1, wherein the integrity monitor is configured to reset the one or more application processing cores and the one or more integrity processing cores upon detecting a fault.

18. A system-on-chip comprising:
one or more application processing cores with a first instruction set architecture, wherein the one or more application processing cores are configured to execute an integrity application and one or more safety critical applications, wherein the integrity application is configured to generate one or more integrity application outputs, wherein the one or more safety critical applications do not include application specific independent integrity checks capable of detection of a common mode failure;
one or more integrity processing cores with a second instruction set architecture, wherein the first instruction set architecture and the second instruction set architecture are different, wherein the one or more integrity processing cores are configured to execute an integrity monitor, wherein the integrity monitor is configured to generate one or more integrity monitor outputs, wherein the integrity monitor is configured to compare the one or more integrity application outputs and the one or more integrity monitor outputs to detect one of a valid-compare or a mis-compare;
an integrity memory; and
one or more communication interfaces, wherein the one or more communication interfaces are configured to provide one or more inputs to the one or more application processing cores and the one or more integrity processing cores; wherein the integrity application comprises a set of commands, wherein the set of commands use the one or more inputs to exercise the first instruction set architecture used by the one or more safety critical applications;
wherein the one or more application processing cores and the one or more integrity processing cores are asynchronized, wherein the integrity memory is configured to provide temporal buffering between the one or more integrity application outputs and the one or more integrity monitor outputs when the integrity monitor compares the one or more integrity application outputs and the one or more integrity monitor outputs; wherein the integrity memory maintains a strike counter, wherein the integrity monitor causes the strike counter to increment one or more strikes when the integrity monitor detects the mis-compare.

19. A system-on-chip comprising:
one or more application processing cores with a first instruction set architecture, wherein the one or more application processing cores are configured to execute an integrity application and one or more safety critical applications, wherein the integrity application is configured to generate one or more integrity application outputs, wherein the one or more safety critical applications do not include application specific independent integrity checks capable of detection of a common mode failure;

one or more integrity processing cores with a second instruction set architecture, wherein the first instruction set architecture and the second instruction set architecture are different, wherein the one or more integrity processing cores are configured to execute an integrity monitor, wherein the integrity monitor is configured to generate one or more integrity monitor outputs, wherein the integrity monitor is configured to compare the one or more integrity application outputs and the one or more integrity monitor outputs to detect one of a valid-compare or a mis-compare;

an integrity memory; and one or more communication interfaces, wherein the one or more communication interfaces are configured to provide one or more inputs to the one or more application processing cores and the one or more integrity processing cores; wherein the integrity application comprises a set of commands, wherein the set of commands use the one or more inputs to exercise the first instruction set architecture used by the one or more safety critical applications;

wherein the one or more application processing cores and the one or more integrity processing cores are asynchronized, wherein the integrity memory is configured to provide temporal buffering between the one or more integrity application outputs and the one or more integrity monitor outputs when the integrity monitor compares the one or more integrity application outputs and the one or more integrity monitor outputs; wherein the integrity memory maintains an integrity application output buffer and an integrity monitor output buffer; wherein the integrity memory is configured to provide temporal buffering by the integrity application output buffer and the integrity monitor output buffer;

wherein the integrity memory is configured to store the one or more integrity application outputs and the one or more integrity monitor outputs in the integrity application output buffer and the integrity monitor output buffer, respectively; wherein the integrity monitor is configured to compare the one or more integrity application outputs stored in the integrity application output buffer and the one or more integrity monitor outputs stored in the integrity monitor output buffer to detect one of the valid-compare or the mis-compare.

20. The system-on-chip of claim 19, wherein the integrity monitor detects the valid-compare when at least one of the one or more integrity application outputs in the integrity application output buffer match at least one of the one or more integrity monitor outputs in the integrity monitor output buffer;

wherein the integrity monitor detects the mis-compare when none of the one or more integrity application outputs in the integrity application output buffer match the one or more integrity monitor outputs in the integrity monitor output buffer.

\* \* \* \* \*